(12) United States Patent
Al Sabawi

(10) Patent No.: US 10,582,003 B2
(45) Date of Patent: Mar. 3, 2020

(54) PROGRESSIVE CONTENT DEVELOPMENT AND MANAGEMENT PLATFORM AND ASSOCIATED METHODS

(71) Applicant: Khaled Al Sabawi, Toronto (CA)

(72) Inventor: Khaled Al Sabawi, Toronto (CA)

( * ) Notice: Subject to any disclaimer, the term of this patent is extended or adjusted under 35 U.S.C. 154(b) by 408 days.

(21) Appl. No.: 15/388,967

(22) Filed: Dec. 22, 2016

(65) Prior Publication Data

US 2018/0183892 A1   Jun. 28, 2018

(51) Int. Cl.
| | |
|---|---|
| *G06F 15/16* | (2006.01) |
| *H04L 29/08* | (2006.01) |
| *G06Q 10/10* | (2012.01) |
| *H04L 29/06* | (2006.01) |
| *G06F 3/14* | (2006.01) |
| *G06F 3/147* | (2006.01) |

(52) U.S. Cl.
CPC .......... *H04L 67/2857* (2013.01); *G06F 3/147* (2013.01); *G06F 3/1454* (2013.01); *G06Q 10/10* (2013.01); *H04L 67/06* (2013.01); *H04L 67/1095* (2013.01); *H04L 67/1097* (2013.01); *H04L 67/306* (2013.01); *H04L 69/28* (2013.01); *G09G 2370/022* (2013.01); *G09G 2370/12* (2013.01); *G09G 2370/16* (2013.01)

(58) Field of Classification Search
None
See application file for complete search history.

(56) References Cited

U.S. PATENT DOCUMENTS

| | | |
|---|---|---|
| 7,146,343 B2 | 12/2006 | Donahue |
| 7,171,448 B1 | 1/2007 | Danielsen |

(Continued)

FOREIGN PATENT DOCUMENTS

WO     2010142982 A1    12/2010

OTHER PUBLICATIONS

Jordà, Sergi, and O. Wust. "A system for collaborative music composition over the web." Database and Expert Systems Applications, 2001. Proceedings. 12th International Workshop on. IEEE, 2001. (6 pages).

(Continued)

*Primary Examiner* — Umar Cheema
*Assistant Examiner* — Anthony T Rotolo
(74) *Attorney, Agent, or Firm* — Jenna L. Wilson; Wilson Lue LLP

(57) ABSTRACT

An improved collaborative authoring system and method provides for management of complex collaborative works comprising sets of elements related to each other in a hierarchy. The collaborative work is defined as including a plurality of element sets. During a submission period, contributing users are permitted to submit proposed elements for a corresponding element set. Reviewing users, which may include contributing users, can concurrently submit feedback in response to the proposed elements that are submitted, and contributing users can modify proposed elements. At the end of the submission period, one or more of the proposed elements are selected for inclusion in the collaborative work. Multiple submission periods may occur for multiple element sets. The collaborative work can be used to generate an output file that can contain only a subset of the elements submitted during the submission periods.

36 Claims, 9 Drawing Sheets

(56) References Cited

U.S. PATENT DOCUMENTS

| | | | |
|---|---|---|---|
| 7,603,626 B2 | 10/2009 | Williams | |
| 7,933,952 B2 | 4/2011 | Parker | |
| 8,027,944 B1* | 9/2011 | Heidenreich | G06N 5/02 |
| | | | 706/46 |
| 8,180,826 B2 | 5/2012 | Hua | |
| 8,196,032 B2 | 6/2012 | Hua | |
| 8,425,325 B2 | 4/2013 | Hope | |
| 8,589,804 B2 | 11/2013 | Seth | |
| 8,694,896 B2 | 4/2014 | Edwards | |
| 9,390,398 B2 | 7/2016 | Williams | |
| 2003/0060910 A1* | 3/2003 | Williams | G06Q 10/10 |
| | | | 700/91 |
| 2005/0086230 A1 | 4/2005 | Frees | |
| 2006/0218476 A1 | 9/2006 | Gombert | |
| 2006/0287966 A1 | 12/2006 | Srinivasaraghavan | |
| 2007/0157164 A1 | 7/2007 | Fannin | |
| 2007/0192175 A1 | 8/2007 | Lee | |
| 2008/0244419 A1 | 10/2008 | Kurpick | |
| 2010/0100439 A1 | 4/2010 | Jutla | |
| 2010/0121650 A1 | 5/2010 | Hughes | |
| 2012/0317108 A1 | 12/2012 | Okazaki | |
| 2013/0117160 A1 | 5/2013 | Potash | |
| 2014/0237053 A1* | 8/2014 | Abhyanker | H04W 4/21 |
| | | | 709/204 |
| 2015/0012820 A1 | 1/2015 | App | |
| 2015/0135300 A1* | 5/2015 | Ford | G06F 16/93 |
| | | | 726/11 |
| 2015/0161632 A1* | 6/2015 | Humay | G06Q 30/0203 |
| | | | 705/7.32 |
| 2015/0254918 A1 | 9/2015 | Miller | |
| 2015/0339270 A1 | 11/2015 | Morton | |
| 2016/0071058 A1 | 3/2016 | Galuten | |
| 2017/0116581 A1* | 4/2017 | Shah | G06Q 10/1097 |

OTHER PUBLICATIONS

Cheng, J., Kang, L., & Cosley, D. (Apr. 2013). Storeys: designing collaborative storytelling interfaces. In CHI'13 Extended Abstracts on Human Factors in Computing Systems (pp. 3031-3034). ACM.

Greer, Nick, Jaime Teevan, and Shamsi T. Iqbal. An introduction to technological support for writing. Technical Report. Microsoft Research Tech Report MSR-TR-2016-001, 2016. (12 pages).

Kim, Joy, et al. "Mechanical Novel: Crowdsourcing Complex Work through Reflection and Revision." arXiv preprint arXiv:1611.02682 (2016). (13 pages).

Kim, Joy, Justin Cheng, and Michael S. Bernstein. "Ensemble: exploring complementary strengths of leaders and crowds in creative collaboration." Proceedings of the 17th ACM conference on Computer supported cooperative work & social computing. ACM, 2014. (11 pages).

Teevan, Jaime, Shamsi T. Iqbal, and Curtis von Veh. "Supporting collaborative writing with microtasks." Proceedings of CHI. 2016. (12 pages).

* cited by examiner

PROGRESSIVE CONTENT DEVELOPMENT AND MANAGEMENT PLATFORM AND ASSOCIATED METHODS

BACKGROUND

1. Technical Field

The present disclosure relates to electronic collaborative authoring systems, and in particular to management of user contributions to collaborative works and generation of output files from collaborative works.

2. Description of the Related Art

Crowdsourced and collaborative generation of creative works (including literary, cinematographic, video, graphic, architectural, and artistic works) have increased in popularity with widespread availability of the Internet and mobile access. Networked collaborative authoring systems, in particular, enable multiple users to edit the same content concurrently or nearly concurrently; to edit other users' contributions; and even engage in discussion or provide feedback to other users regarding their contributions. The users may be distributed over wide geographic areas, enabling collaboration between users across the country or around the world.

However, when a large number of users are participating in a collaborative authoring session, it can become difficult to track user contributions, and to effectively apply user feedback while maintaining control over the structure of the collaborative work.

BRIEF DESCRIPTION OF THE DRAWINGS

In drawings which illustrate by way of example only embodiments of the present application.

DETAILED DESCRIPTION

The examples and embodiments described herein provide an improved system, method, and data processing device-readable medium for implementing and managing collaborative content generation in a progressive or staged process that provides for tracking and association of individual contributed elements of a collaborative work with both individual contributors and other elements of the collaborative work.

These embodiments and examples are described and illustrated primarily in the context of a data processing environment comprising one or more data processing systems, which may operate over a local or wide-area network. FIGS. 1-4 illustrate select components of a networked data processing system and computing devices or systems that are suitable for use with the contemplated embodiments.

Figure 1:
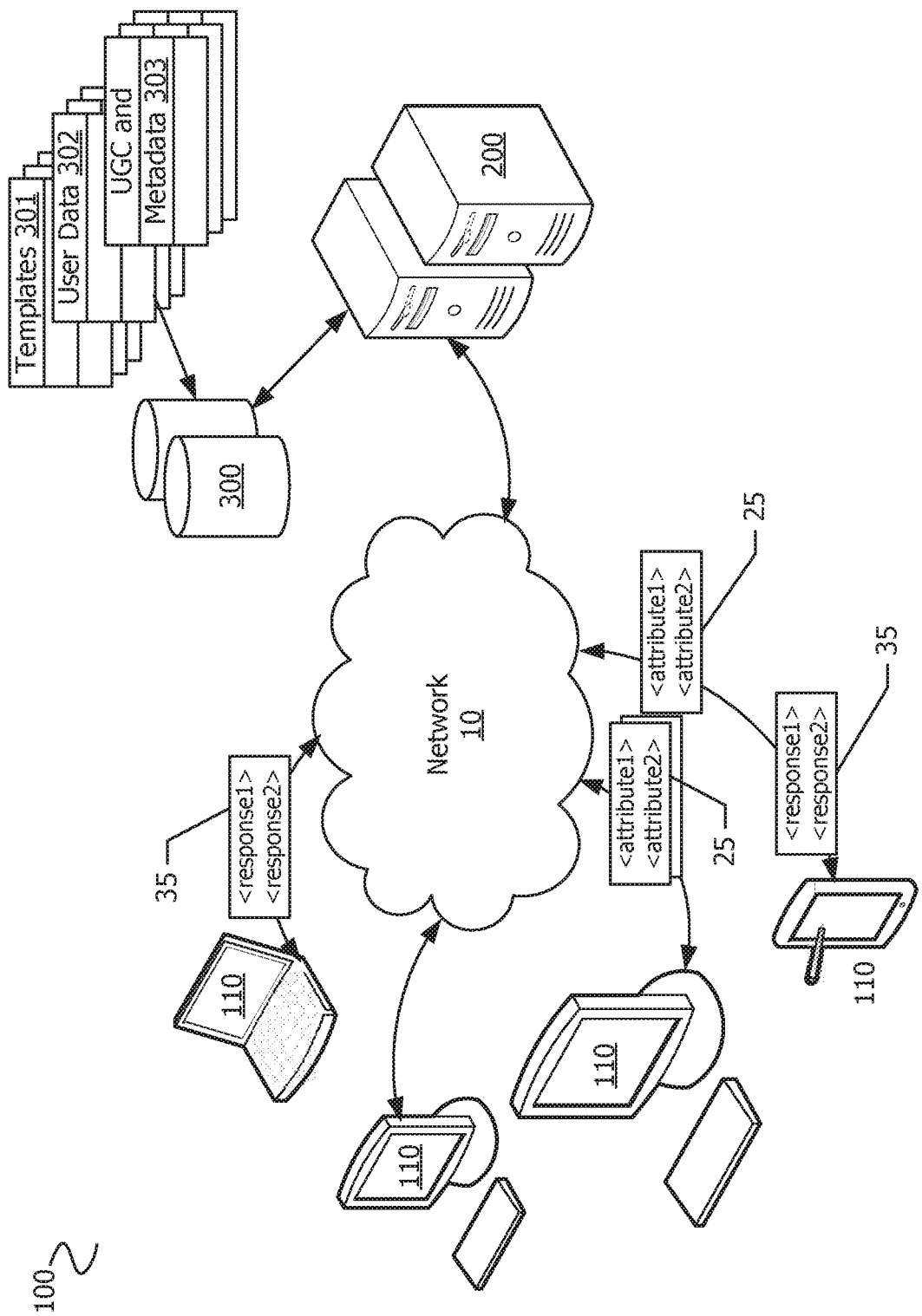
FIG. 1 is an illustration of a data processing environment including client and server systems.

The progressive content development and management platform can be implemented using client 110 and server data processing systems 200 in communication over a network 10 in a data processing environment 100 such as that illustrated in FIG. 1. This figure illustrates one possible network topology for use in the environment 100, and is by no means limiting. In this example, a number of client data processing systems 110 communicate with a server data processing system 200 over a wide area network 10, such as the Internet. The network 10 need not be the Internet, or a wide area network; the network 10 may be public or private, wide or local, fixed or wireless. It is expected that a common implementation will, however, be over the Internet or a wide area network, in view of the current popularity of cloud-based services. In a typical implementation, the client systems 110 and the server system 200 may be physically and geographically removed from one another. In other implementations, however, the two systems may be provided at the same physical location, for instance in communication over a local area network. Either way, the client and server systems 110, 200 may be considered either physically or logically "remote" from one another. The client systems 110 and server system 200 are described in further detail with reference to FIGS. 2-4. Briefly, users (not shown) operating client systems 110 communicate with the server system 200 over the network 10 to provide user-generated content elements 25 and user responses 35 to the server system 200, which processes and stores received user communications in a data store or stores 300. The data stores 300 operated by the server system thus store the user-generated content elements and associated metadata 303, as well as user account data 302 and templates and element definitions 301 associated with various types of collaborative works, as discussed below.

Figure 2:
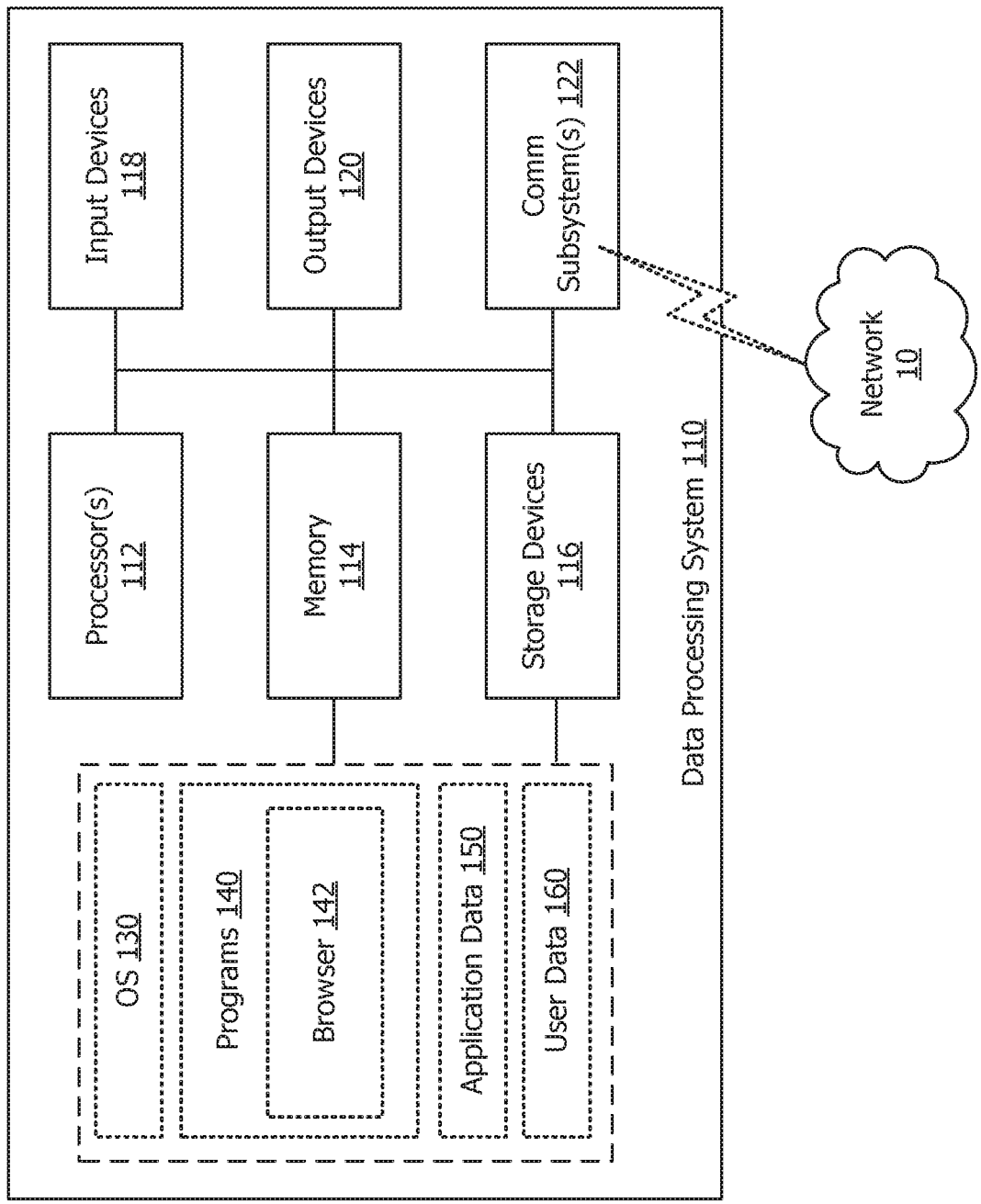
FIG. 2 is a schematic of select components of a client computing system for use with the data processing environment of FIG. 1.

FIG. 2 is a block diagram of select components of an example client data processing system 110, which may be embodied in a single device, such as, but not limited to, a desktop computer, workstation or terminal, or mobile computer (e.g., laptop computer, tablet computer, or smartphone). While the example system 110 is illustrated herein as a desktop computer or workstation, it will be appreciated by those skilled in the art that this is not intended to be limiting, and the solutions described herein may be implemented on any suitable data processing device that is configurable to operate as described, whether or not this device is primarily intended for productivity uses or other types of uses.

Operation of the system 110 is generally controlled by a main processor or processors 112. The system 110 may be operated under mains power or may be a battery-powered device, not shown. Data, programs, and other instructions or information can be stored in one of several possible memory components of the system 110, such as internal memory 114 (which can include standard volatile and non-volatile memory components, which can be integrated with other components such as the processor 112 or provided as distinct components). Information can also be stored in the system 110 on other storage devices, either internal or external, such as hard drives, flash drives, memory cards, and peripheral devices, not shown in FIG. 2. Typically, software and data components such as the operating system (OS) 130, programs (applications) 140, locally stored application data 150, and user data 160 are stored in resident persistent memory. In some systems 110, some components of the OS 130 may be embedded as firmware in integrated memory in the processor 112. However, portions of such components may be temporarily loaded into volatile memory. In this example, the programs 140 can include, among others, a general purpose user agent such as a web browser application 142 which is used to access the progressive content development and management platform. Alternatively, a dedicated application (not shown) may be provided to implement the examples described here. Implementation using a browser 142 provides, among other advantages, improved mobility and portability on the part of users, who may be distributed globally or across a wide geographic area. Application data 150, which can include configuration information, and user data 160, which can include contacts, message stores, word processing files, and the like, may be stored in resident persistent memory of the client system 110, or in a storage device 116.

The data processing system 110 is provided with user or sensor input devices 118. User input devices can include a touch and/or pointing device, such as a touchscreen, touchpad, mouse, or trackball; a keyboard; security peripherals such as a biometric scanner; and multimedia input devices, such as cameras or microphones. The system 110 may also have environmental or contextual input devices such as an orientation or inertial navigation sensor (particularly in the case of a touchscreen device), ambient light sensor, or a global positioning system (GPS) or other location detection module. The system 110 can also include one or more output devices 120, including in particular a display screen, which may be integrated in the chassis of the data processing system 110, or else provided as a peripheral device. The system 110 may be configured to output data to an external monitor or panel, tablet, television screen, projector, or virtual retinal display, via a data port or transmitter, such as a Bluetooth® or WiFi® transceiver, USB port, HDMI port, DVI port, and the like. The data port or transmitter may be one of the communication subsystems 122 illustrated in FIG. 2. Graphics data to be delivered to the display screen is either processed by the processor 112, or else by a dedicated graphics processing unit, not included in FIG. 2. Other output devices include speakers, and haptics modules. Not all of these suggested input or output devices are required, and many may be omitted. For instance, where the primary user interface of the system 110 is a touchscreen, a physical keyboard may be omitted altogether.

Communication functions, comprising at least data and optionally voice communications, are performed through one or more communication subsystems 122 in communication with the processor 112. Other functional components used to accomplish communication functions, such as antennae, decoders, oscillators, digital signal processors, and the like, may be considered to be part of these subsystems. Wireless communication subsystems are used to exchange data with wireless networks or other wireless devices in accordance with one or more communications standards, including, without limitation, wireless LAN (e.g., one or more of the 802.11™ family of standards), Bluetooth® and the like. The particular design of a communication subsystem is dependent on the communication network 10 with which it is intended to operate. The communication subsystems 122 may include adaptors for use with wired connections as well.

It will be understood by those skilled in the art that the components illustrated in FIG. 2 are merely representative of particular aspects of the data processing system 110, and that other components that are typically included in such a device have been excluded in the drawings and this description only for succinctness. Furthermore, those skilled in the art will understand that the system 110 may be successfully used with the various examples described herein even when some components described in relation to FIG. 2 are omitted.

Figure 4:
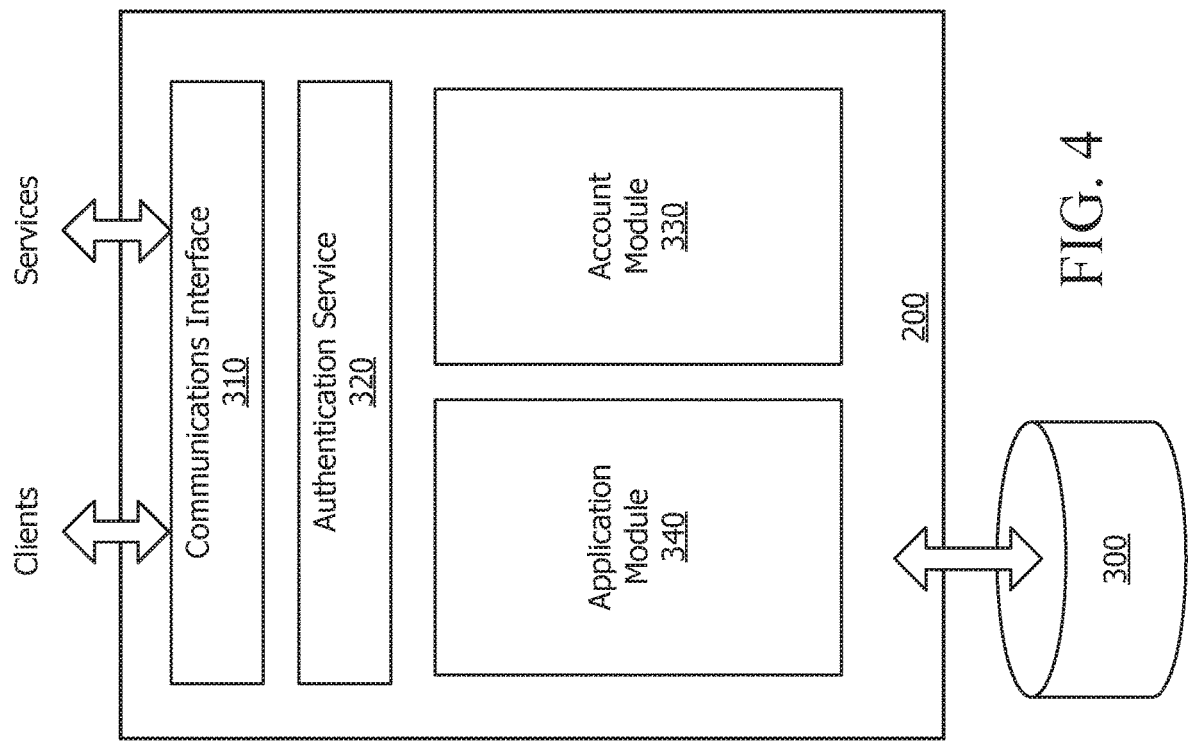
FIG. 4 is a further schematic of select modules of the server of FIG. 3.
Figure 3:
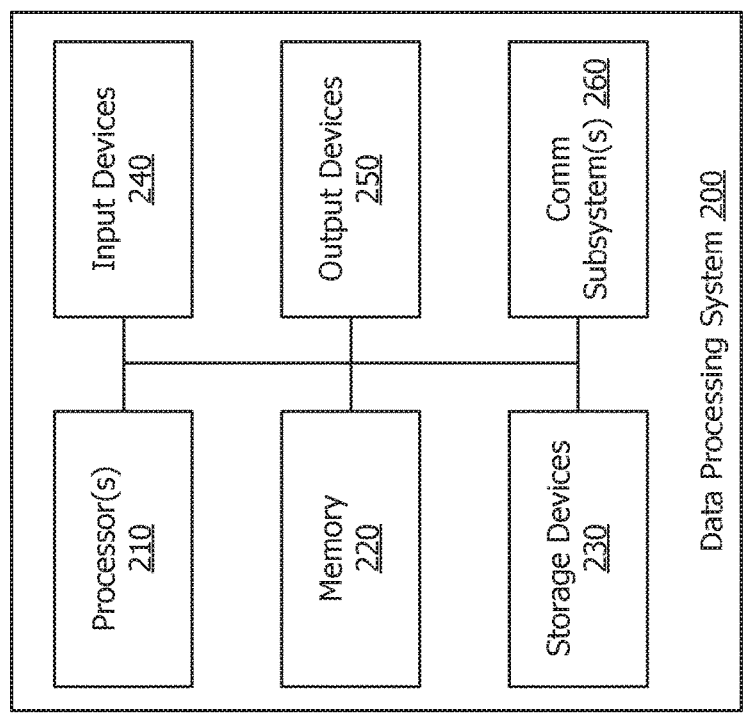
FIG. 3 is a schematic of select components of a server computing system for use with the data processing environment of FIG. 1.

Select components of a server data processing system 200 are illustrated in FIGS. 3 and 4. Again, it will be appreciated by those skilled in the art that these components are merely representative, and that some of these components may be omitted or substituted while still achieving successful operation of the embodiments and examples described herein. In FIG. 3, components similar to those of the client data processing system 100 are illustrated, including one or more processors 210, memory 220, storage devices 230, input and output devices 240, 250 respectively, and communication subsystems 260. The appropriate selection of components for a server system 200 will be known to those skilled in the art. While the server system 200 may include local storage devices 230, data processed or managed by the server may be stored remotely from the server system 200, for example in the data storage system 300 illustrated in FIGS. 1 and 4.

FIG. 4 illustrates components of the server system 200 from a functional perspective. These components interact with each other to provide the content development and management platform. The system 200 may include a communications interface module 310, which brokers communication with external systems or services, including client systems 110, and optionally third-party or remote systems supporting other functions, such as a payment transaction system (not illustrated). The communications interface module may include an HTTP server, where client systems 110 access the server system 200 using a web browser. The system 200 can also include an authentication service 320 for authenticating users and granting access to the functions provided by the server system 200, and an associated account module 330 which manages user account information (e.g., contact information, user identity, tracking user compliance with terms of service, etc.). In some implementations, the authentication service 320 may be operated by a third party on behalf of the operator of the server system 200, and thus not included in the system 200. The account module 330 can also operate to manage user permissions with respect to collaborative works managed by the system 200.

The example server system 200 of FIG. 4 also includes an application module 340, which executes code to generate user interfaces (e.g., webpages or other media) for delivery to client systems 110, and receive submissions from users at their client systems 110, via the communications interface 310; processes received submissions; manages collaborative works and elements generated by users, and stored in the data storage system 300; executes countdown timers; and generates output files from the collaborative works, as described below. Administrative modules employed by the operator of the server system 200 for the purpose of maintenance and updating of various system functions are not illustrated.

The various functional units of the server system 200 may be implemented across multiple data processing devices and multiple data storage systems, and not merely one data processing system or data storage system as schematically illustrated herein. Thus, for example, the system 200 may comprise a discrete application server rather than an application module 340.

Figure 5:
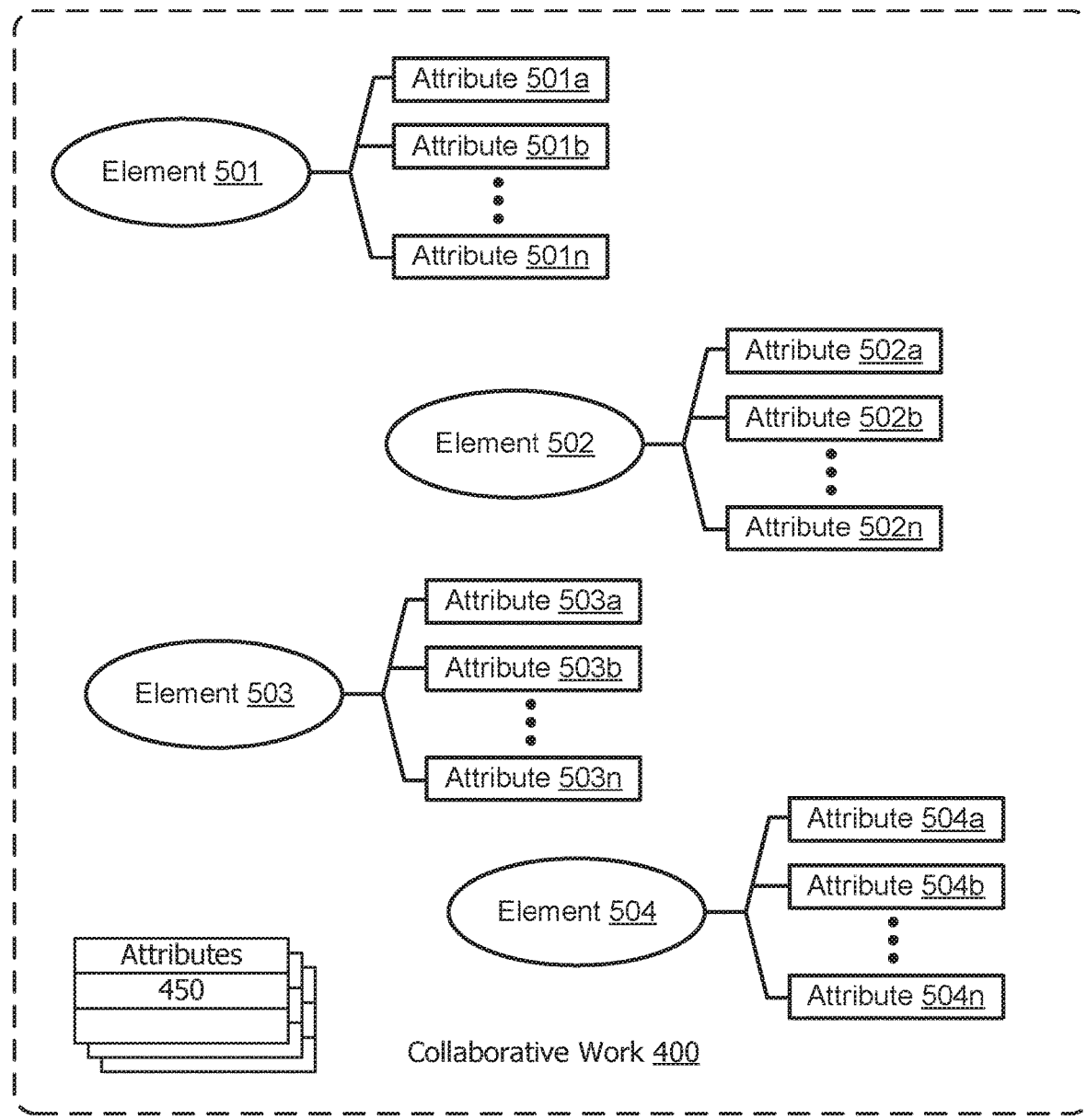
FIG. 5 is a schematic illustrating a collaborative work comprising a set of elements as defined in a data storage medium.
Figure 6:
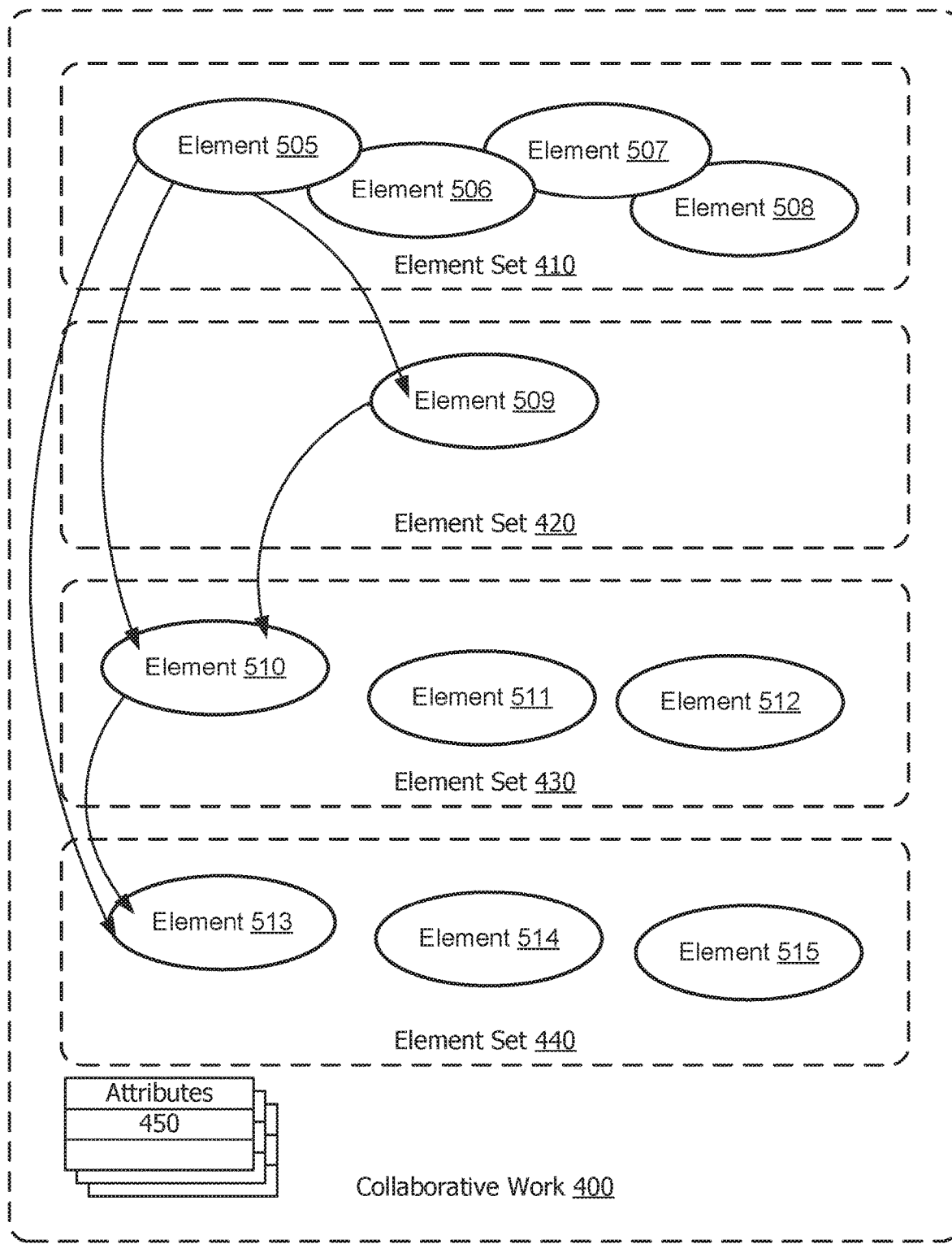
FIG. 6 is a schematic illustrating a hierarchical relationship between sets of elements within a collaborative work.

FIGS. 5 and 6 illustrate, in schematic form, possible relationships between individual elements of a collaborative work 400, in which FIG. 5 illustrates a "flat" relationship among elements 501, 502, 503, and 504, having corresponding attributes 501*a-n*, 502*a-n*, 503*a-n*, and 504*a-n*, respectively. Collaborative works 400 may be of different defined types depending on the nature of the output file to be generated by the system 200. In the example of FIG. 5, each collaborative work type is defined by a template 301 that identifies a set of defined element types (e.g., elements 501-504 illustrated in FIG. 5) and attributes for that type of collaborative work 400. Attributes 450 of a given collaborative work 400 of a selected type can include user-generated or user-selected values, such as a title and description. Other attributes 450 of the collaborative work 400 can be generated automatically by the system, such as a descriptive label for the type of collaborative work (e.g., "novel", "film screenplay", "television screenplay", "short story"); ownership or attribution information (e.g., a userid associated with the user initiating the collaborative work or contributing elements of the work 400); a timestamp value indicating a time of creation or receipt, or an editing time. Further attributes 450 may be either user-defined or system-defined, such as a format for files output by the system 200 based on the collaborative work 400, such as a file format (portable document format, image, word processing document, HTML, etc.); rules for selecting user-submitted elements for inclusion in the collaborative work 400, as will be discussed below; validation rules to determine whether user-defined content, such as user-defined attributes, is legal (e.g., character format rules, prohibited content rules); audience or age ratings (e.g., minimum ages for participation, and/or ratings for general audiences, parental guidance, restricted, etc.) and rules for selecting which included elements are incorporated in an output file generated by the system 200 from the collaborative work 400. Not all of the example attributes listed above need be included for a given collaborative work 400. The definition of particular attributes for the collaborative work 400 will depend on the type of work, and may be defined by those skilled in the art.

Elements 501-504 defined for the example collaborative work 400 are selected in dependence on the collaborative work type. The total number of elements, and element types, may vary; the illustrated schematics should not be interpreted as limiting. For example, in a collaborative work 400 comprising elements in a "flat" structure as in FIG. 5, a simple "short story" collaborative work type may include a series of elements that are organized in a defined, linear, order in the output work, corresponding to title, exposition, rising action, climax, falling action, and resolution. An "academic" collaborative work type may include elements corresponding to a title, abstract, introduction, related work, research, findings, conclusion, and endnotes. Not every element need be distinct; for example, where the collaborative work is a "screenplay", the elements of the work can include several acts and scenes to be presented in a defined order, as discussed below.

Table 1 illustrates example content for a given collaborative work template 301. It will be understood by those skilled in the art that the tabular layouts used to illustrate content herein do not necessarily represent the data structure in which the template, work, or element information is stored by the system 200:

TABLE 1

Example template for a collaborative work.

| Template <ID> | | |
|---|---|---|
| Collaborative Work Type | <system-defined> | |
| Attribute | Value | Rule(s) |
| <title> | <user-defined> | <ruleset 1> |
| <description> | <user-defined> | |
| <created date> | <system-defined> | |
| <owner> | <system-defined> | |
| <voting rules> | <user-defined> | <ruleset 2> |
| <output format> | <system-defined> | <ruleset 3> |
| <output content> | <system-defined> | <ruleset 4> |
| Required Elements | Attributes-Values | Rule(s) |
| <element type 1> | <attrib-val set 1> | <ruleset 5> |
| <element type 2> | <attrib-val set 2> | <ruleset 6> |
| <element type 3> | <attrib-val set 3> | <ruleset 7> |

As illustrated in the example template 301 in Table 1, a given collaborative work template 301 can include a set of collaborative work attributes (e.g., <title>, <description>, etc.), with either user or system-defined values. User-defined values may be defined solely by an owner or initiator of the collaborative work 400, or else selected by a group of contributing users, as described below, particularly with reference to FIGS. 7-9. Optionally, rules may be associated with the attributes as mentioned above (e.g., to determine whether a user-submitted value is permissible). In addition, in this example, the template 301 includes a <voting rules> attribute, which defines one or more rules (<ruleset 2>) for counting user feedback, in the form of responses, votes, clicks, or other indicators, as discussed below. In this example, these rules are user-defined, but in other examples the rules may be predefined in the system for the collaborative work 400. The template 301 can also include attributes for the collaborative work 400 defining which elements of the collaborative work 400 are to be included in an output file or document generated from the collaborative work (e.g., <output content>), and the format in which these elements are presented in the output file (e.g., <output format>). These attributes may be system-defined as well, although in some implementations users may be permitted to configure these attributes.

The template 301 also includes a definition of "Required" elements in this example, specifying different types of elements (<element type 1>, etc.) that are required in a complete collaborative work. The template 301 can include rules for each type of required element to specify a minimum and/or maximum number of elements of that type that must be included in a complete collaborative work. In some templates, elements may be optional, or additional elements beyond those required elements specified in the template may be added. Each element includes one or more attributes (<attrib-val set 1>, etc.) with corresponding values that may be user-defined or system-defined, like the attributes of the collaborative work 400, and may be associated with rules (<ruleset 5>, etc.). Table 2 sets out, schematically, the components of an example element in FIG. 5:

TABLE 2

Example element 504 for collaborative work 400.

| Element <ID> | | |
|---|---|---|
| Element Type | <system-defined> | |
| Containing Collaborative Work | | <system-defined> |
| Order | <user-defined> | |
| Attribute | Value | Rule(s) |
| <title> | <user-defined> | |
| <created date> | <system-defined> | |
| <owner> | <system-defined> | |
| <vote count> | <system counted> | |
| <content> | <user-defined> | <ruleset 8> |

In this example, element is defined with an element type, which includes a system-predefined descriptive label (e.g., "chapter", "act", "scene", "script", "poster", "video", "trailer"). The element also includes a reference to a containing collective work ("containing collaborative work"), which is system defined. In the example of FIG. 5, elements 501-504 would each include a reference to an identifier for the collaborative work 400. Furthermore, in the example "flat" relationship between elements 501-504 in FIG. 5, it may be necessary to specify an ordinal value ("order") indicating the relative order of the element 504 within the set of elements 501-504 in the work. Thus, another attribute stored in relation to an element may be an ordinal value.

The element in the example of Table 2 requires a number of attributes, some of which are system-defined and others of which are user-defined. In this example, the title (<title>) and content (<content>) can be obtained from user-entered submissions. Other attributes, such as ownership or attribution information for the element identifying the user who submitted the element (<owner>) and timestamps <created date>, are system-defined. Attributes may be associated with rules defining an attribute value; for example, <ruleset 8> may define appropriate formats for the user-defined content, e.g., text (plaintext, HTML, RTF, etc.), image, or video format. The element also includes a <vote count> attribute, or similar attribute for recording user responses to the element, as described below. As with the attributes of the collaborative work 400, the example attributes illustrated in Table 2 above need not be included in the definition of an element in a collaborative work; the designation of particular attributes for a given element will depend on the element type and the collaborative work type, and can be determined by the person skilled in the art.

As mentioned above, FIG. 5 illustrates a collaborative work 400 which has a flat relationship among individual the individual elements 501, 502, 503, and 504. It will be understood by those skilled in the art that the schematic representations of in the accompanying figures do not by themselves denote a particular layout or ordering of the elements within the work 400, but rather a semantic or contextual relationship between the elements; as explained above, formatting and ordering of elements may be defined by attributes of the collaborative work 400 or individual elements. Individual elements 501-504, which comprise a set of attributes 501a-n, etc. can be stored electronically in a data store (e.g., data storage system 300) in a suitable format, such as a flat file or relational database structure. For instance, elements and even their containing collaborative works may be stored as key-value pairs in object or markup notation.

In a collaborative work 400 without a hierarchical relationship between elements, it is generally expected that the elements 501-504 included in the collaborative work 400 are directly included in the finished output file that is generated from the collaborative work 400. For example, the four elements in the collaborative work 400 shown in FIG. 5 may correspond to a collaborative report consisting of an introduction (element 501), exposition (element 502), analysis (element 503), and conclusion (element 504). The content contributed by users for each of these elements would therefore consist of text content, and optionally graphic or other content, that is directly reproduced in the finished report document generated from the collaborative work.

However, the planning and generation of a creative work is often not as straightforward as simply generating each individual component to be reproduced in the finished document or file. For example, in the authoring of a screenplay for a film, the work is typically authored by first defining a setting, time period, and title for the work; defining characters in the screenplay, including name, age, race, occupation, character flaws, descriptions, and optionally illustrations; subsequently defining a story outline, scene outlines, and finally a script with acting instructions and scene directions. While each of these components may be generated in the process of creating the work and may be deemed necessary by authors for the successful creation of a film screenplay, not all these components are necessarily included in the output document or file—namely, a completed script—resulting from the process. As another example, in the creation of architectural drawings for a building, a preliminary site plan and outline specifications may be produced before the final technical drawings are generated. The process of authorship in creative works thus does not match the conventional "flat" architecture of current collaborative authoring systems, which controls only the contribution of those components that are included in the finished document or file. The creative composition process may be considered to be a more progressive and hierarchical process, where initial content comprising more abstract or general information is first produced, and subsequent content incorporates the information from previously generated content to arrive at more defined and usable information (e.g., a blueprint, CAD drawing, finished story, or screenplay). Accordingly, in the improved collaborative authoring system and method defined herein, elements of a work are stored in a hierarchical relationship and contributions of these elements are controlled in a manner that preserves the relationships among the elements.

FIG. 6 illustrates, schematically, a more hierarchical relationship among different elements 505-515 in the collaborative work 400. In this example, the example collaborative work 400 is a screenplay. A first set of elements 410 comprised in the work 400 may correlate to the initial components of a screenplay typically authored at the outset of a screenplay writing project, such as characters (element 505), setting (element 506), time period (element 507), and title (element 508). There may be a plurality of elements of a given type, such as character elements 505, setting elements 506, and time periods 507; but only a single instance of other types of elements, such as title element 508. Another set of elements 420 in the work 400 may correlate to a next stage in the authoring process, such as storyline (element 509); in this example, the second set of elements 420 consists of only a single instance of the storyline element type. Once the storyline is composed, the next set of elements 430 of the collaborative work 400 may be a set of scene summaries (elements 510, 511, and 512) arranged in a specific order that break down the storyline (element 509); the number of scene summary elements may vary depending on the purpose of the screenplay (e.g., whether it is meant for film, stage, or television). Once the scene summaries have been created, then script scene elements comprising dialog, scene directions, and action lines are then created for each individual scene summary. These script scene elements (elements 513, 514, 515) are comprised in a further set of elements 440. Thus, represented electronically, a work 400 with a hierarchical structure comprises discrete sets of elements (410, 420, 430, 440) that are typically composed by an author or authors in a defined order; each discrete set of elements may comprise element types that are distinct from the element types of other sets of elements (e.g., the element types in the first set 410 are different than the element types associated with sets 420, 430, or 440). The collaborative work 400 and the elements 505-510 may comprise similar attribute, value, and rule data as described above with respect to FIG. 5, and can be stored in markup or object notation files, relational database structures, or any other suitable data structure, as described above. Table 3 illustrates an example template for a collaborative work 400 comprising discrete sets of elements:

TABLE 3

Example template for a collaborative work with elements in a hierarchical relationship.

| Template <ID> Collaborative Work Type | <system-defined> | |
|---|---|---|
| Attribute | Value | Rule(s) |
| <title> | <user-defined> | <ruleset 1> |
| <description> | <user-defined> | |
| <created date> | <system-defined> | |
| <owner> | <system-defined> | |
| <voting rules> | <user-defined> | <ruleset 2> |
| <output format> | <system-defined> | <ruleset 3> |
| <output content> | <system-defined> | <ruleset 4> |
| Element Set 1 | Attributes-Values | Rule(s) |
| <element type 1_1> | <attrib-val set 1_1> | <ruleset 1_5> |
| <element type 1_2> | <attrib-val set 1_2> | <ruleset 1_6> |
| <element type 1_3> | <attrib-val set 1_3> | <ruleset 1_7> |
| Element Set 2 | Attributes-Values | Rule(s) |
| <element type 2_1> | <attrib-val set 2_1> | <ruleset 2_5> |
| <element type 2_2> | <attrib-val set 2_2> | <ruleset 2_6> |
| <element type 2_3> | <attrib-val set 2_3> | <ruleset 2_7> |
| Element Set 3 | Attributes-Values | Rule(s) |
| <element type 3_1> | <attrib-val set 3_1> | <ruleset 3_5> |
| <element type 3_2> | <attrib-val set 3_2> | <ruleset 3_6> |
| <element type 3_3> | <attrib-val set 3_3> | <ruleset 3_7> |

In this example, the template 301 includes three sets of required elements (Element Set 1, Element Set 2, Element Set 3) in place of the single set of required elements in the example of Table 1.

The attributes of individual elements may vary depending on the element type, but similar to the elements 501-504, can include attributes comprising ownership information and content, as described above. In addition, certain elements may include linkages or references to other elements in the collaborative work 400. The arrows in FIG. 6 indicate select semantic or contextual relationships between the content attributes. For example, the attributes of characters defined in elements 505 are used by authors to define storyline content in element 509, scene summary content in elements 510-511, and script scene content in elements 513-515. In other words, the content of some subsequently generated elements may depend on the content of earlier elements, and may incorporate references to earlier elements. Thus, the attributes of an element in a hierarchical collaborative work 400 may include references to identifiers for other elements in the work 400, in addition to the example attributes described above.

By defining the components of a collaborative work 400 in the form of discrete elements, as illustrated in FIGS. 5 and 6, it is possible to define a structured process for multi-user collaboration on the collaborative work 400, in which user contribution of discrete elements progresses in defined stages. An example structured process is illustrated in the flowcharts of FIGS. 7 and 8.

In this example, participating users engage the server system 200 over the network using their respective client data processing systems 110. The participating users can notionally be defined as "contributor" and "reviewer"; however, these groups may wholly or partially overlap, i.e., a given user may be both a "contributor" and a "reviewer". A "contributor" user is a user providing submissions to the server system 200 in the form of user-generated content for one or more elements of the collaborative work. A "reviewer" user is a user providing submissions in the form of feedback in respect of one or more contributed elements. Feedback, which may be in the form of ratings, written commentary, votes, or other expressions, is used to determine the inclusion or exclusion of a contributed element in the collaborative work.

Participation in the process may be determined by user account status at the system 200. For example, participation as either a reviewer or contributor may be limited to users with an account in good standing at the system 200; or, participation as a contributor may be limited to users with an account in good standing, while participation as a reviewer may be open to any user accessing the system 200, whether or not they have registered a user account with the system 200. In some implementations, participation as either a contributor, reviewer, or both, may be restricted to users having an account on the system 200 that have also registered an interest in the collaborative work, for example either by initiating the collaborative work process on the system 200, or by registering to "follow" or join as a member of the collaborative work. In further implementations, participation may be limited by a user initiating the collaborative work to selected or invited users who also have accounts on the system 200.

Figure 7:
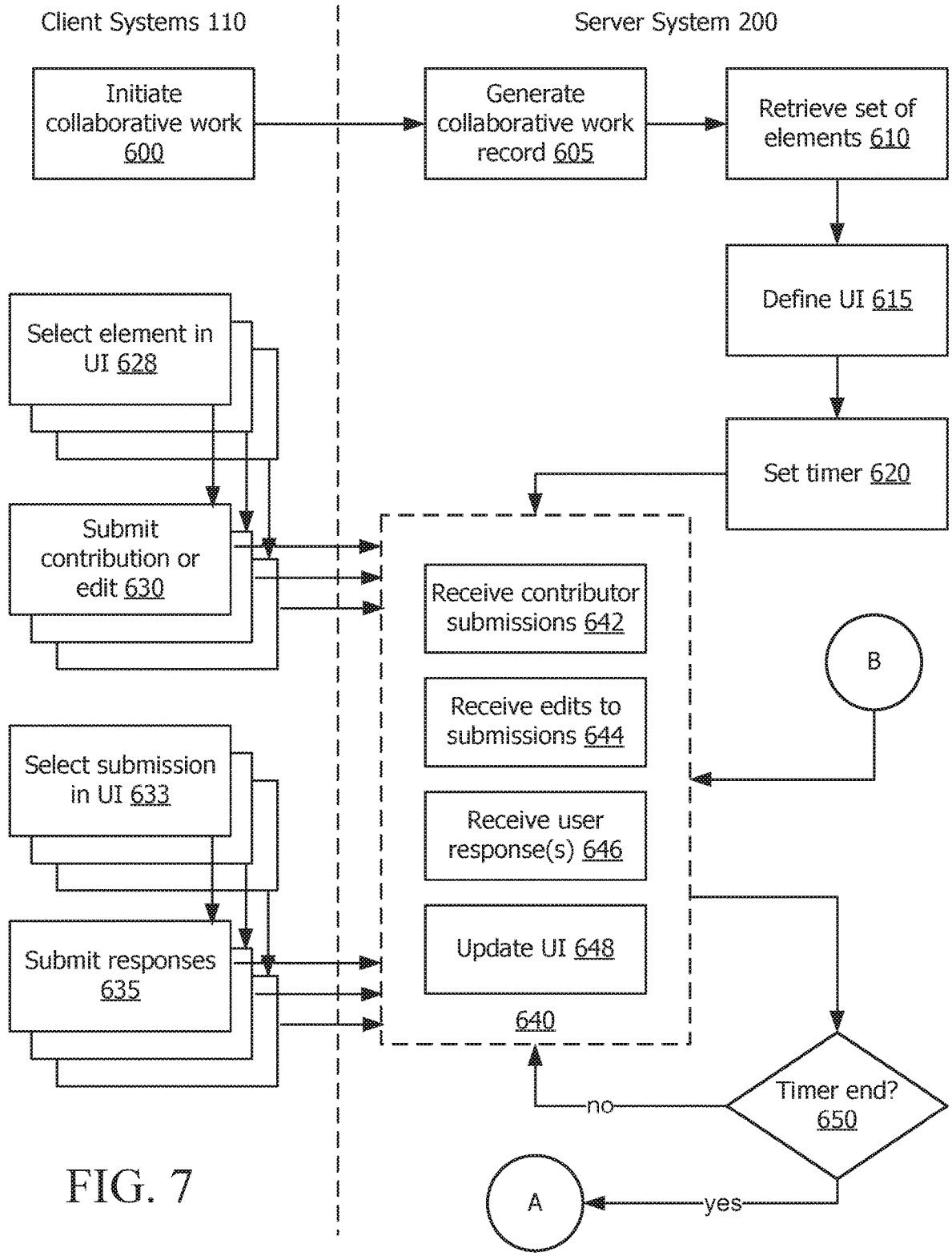
FIGS. 7 and 8 are flowcharts illustrating an overview of a collaborative element management process implemented in the data processing environment of FIG. 1.
Figure 8:
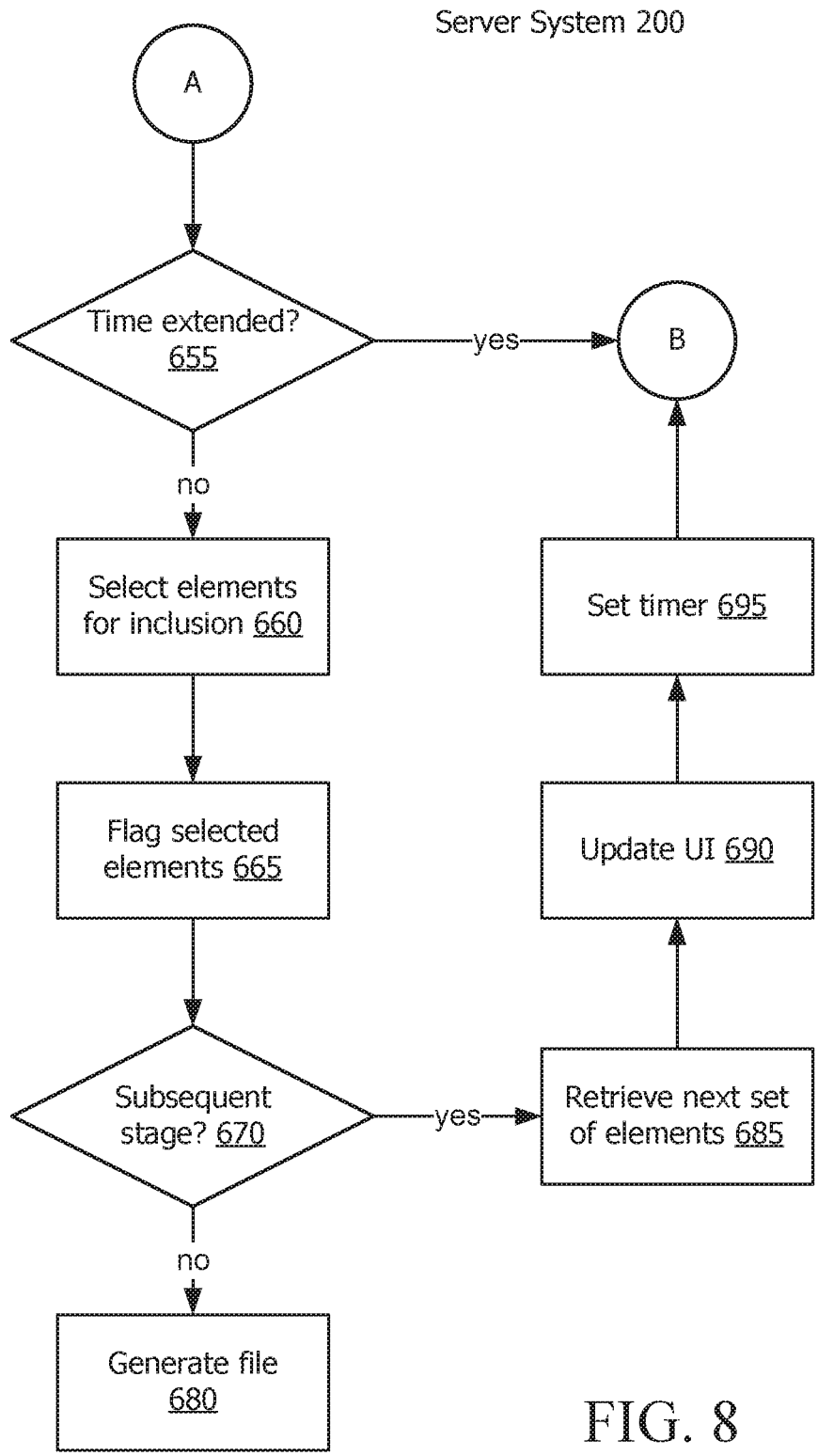

The process begins at 600 in FIG. 7, when a user at a client system 110 invokes an instruction to initiate a collaborative work at block 600. Typically, if the server system 200 is accessed by the user operating a browser application on the client system 110, via a web server executing at the system 200, the instruction may be invoked by user actuation of a user interface element presented by the browser application. Invocation of the instruction can also include selection of a collaborative work type, e.g., a short story, novel, film screenplay, television screenplay, and the like. As discussed above, the collaborative work type can be associated with a template 310 which defines the elements required in the work. Thus, at block 605, in response to receiving the instruction to initiate the collaborative work, the system 200 generates a new collaborative work record for the collaborative work. While "record" suggests a record in a database, the collaborative work may alternatively be a file or collection of files defined and stored in the data storage system 300 in association with an identifier for the user initiating the work and an identifier identifying the collaborative work in the data storage system 300, along with any system-defined attributes that can be defined upon initiation of the collaborative work (e.g., timestamp indicating time of creation). At 610, information defining the sets of elements and attributes of the collaborative work is obtained from the appropriate template 310 in the data store.

The template 310 will define the different sets of elements (e.g., element sets 410, 420, 430, etc.) and the order in which user submissions for these elements should be obtained, along with system-defined default submission periods for receiving user submissions. Each set of elements is associated with a separate submission period. Submission periods generally run sequentially during the process. Submission periods may be defined in according to time or threshold values. A submission period may be a defined time period, typically ranging from minutes to days. The submission period need not be a defined time period, but instead its endpoint may be determined when a certain defined threshold value is met. For example, a given submission period may end once a specified number of feedback submissions (as explained below) have been received; once one element, or a specified number of elements, have received sufficient votes or other feedback to be included; or once each of the submitted elements have received a certain number of votes or other feedback to include or exclude them from a set of elements. Even when the submission period has a defined endpoint, the submission period may be kept open, or not terminate, until at least one submission has been received for each required element in an element set. The definition of the submission period endpoint may comprise a combination of more than one of these conditions; for example, a submission period may be defined as ending on the later of the expiration of a minimum time period and a time at which at least five submitted elements have obtained a specified minimum number of votes, provided each required element in the element set has received a corresponding submission. As another example, the user who initiates the collaborative work may define a specific number of reviewers (who may be contributors as well) and a minimum number of reviewer votes that a submitted element must receive to be selected for inclusion in an element set. The submission period may therefore not terminate until at least one submitted element has received this number of votes.

Starting with the first set of elements defined by the template, at 615 a user interface for presentation via the user's browser is generated by the application module 340. The user interface defines the type of elements to be submitted during the corresponding first submission period. Thus, in the example of FIG. 6, the first set of elements available for submission may be one or more of a title, characters, setting, and time period (e.g., element set 410). At 620, a timer is set to count down the submission period defined or the first set of elements, if the submission period has a defined time period. Note, however, that the initiating user may custom-define a time period for submission, or the submission period may be defined according to other conditions, as explained above. When the submission period is timed, users accessing the user interface may be presented with a countdown timer, or other indication of time remaining for the first time period (such as a progress bar), and user interface options for submitting attributes for one or more of the first set of elements. Thus, at 628, contributor users at their respective client systems 110 may select, in the interface, an element for submission; then at 630, enter and submit data for the user-definable attributes of the element (e.g., for a title element, proposed title text; for a character element, a proposed character name, age, race, and other defining characteristics). The data is transmitted to the system 200 over the network 10 (referring to FIG. 1, the transmission of attribute data is shown as elements 25).

At 640, the application module 340 executes a number of functions 640 during the first submission period. Any contributor submissions of elements are received and stored at 642, and the user interface can be updated at 648 to present the received element submissions in the user interface for reviewing users to review. During the same submission period, reviewing users can submit feedback (referring to FIG. 1, responses 35) for the received element submissions by selecting a particular submission in the user interface at 633, and entering and submitting feedback at 635. The group of reviewing users may be distinct from the group of contributing users; however, in the examples described herein, it is contemplated that the group of reviewing users includes the contributing users as well; in other words, contributing users can also participate by providing feedback at 635. Thus, those users may be considered to have both the role of a contributor and a reviewer, and can submit both elements 25 and responses 35 to the system 200. The feedback can take many forms, including free text commentary entered in a form submission field in the user interface, or a rating or ranking selected or entered in the user interface (e.g., a ranking scale of 1 to 10 indicating the user's impression of the submission quality; a reaction such as a "thumbs up" or "thumbs down"; a single vote in favour of including the submitted element in the collaborative work, or a single vote in favour of excluding the submitted element in the collaborative work). Any feedback is stored in association with the selected element. In some implementations, users can reverse or delete their feedback (e.g., change or remove a vote or reaction). In the example of FIG. 2 above, a <vote count> attribute was included. This attribute may take as a value a running tally of votes in favour of including the element, or against including the element, as the case may be. Thus, as reviewer users submit feedback at 635, the feedback is received at 646 and the user interface can be updated at 648 to reflect the feedback received to date for that particular submitted element.

At the same time, during the same submission period, contributor users may optionally edit their previously-submitted contributions at 630, for example in response to feedback reviewed during the submission period. These submissions are received and stored by the system 200 at 644, and again the user interface can be updated accordingly at 648 to present the edits to the contributed elements. Thus, during a single submission period, users may not only contribute elements for review, but may also review the elements and provide feedback.

At 650, it is determined whether the submission period has expired, i.e., whether the timer has ended. If it has not, the application module 340 continues to carry out the same functions 640. When the submission period has expired, the process moves to a selection phase illustrated in FIG. 8. In some implementations, users may have the option to choose to extend the submission period at 655, if the submission period is a timed period. The option to extend may be provided to the initiator of the collaborative work, or alternatively to either the contributor and/or reviewer users to vote on or select. In addition, where the template 301 for the collaborative work 400 specifies a minimum number of required elements for the current set of elements but insufficient user-submitted elements are available for inclusion in the element set, then the system 200 may automatically determine that the submission period should be extended at 655. If the time is extended, the process returns to 640.

If the time is not extended, at least a subset of the submitted elements received during the submission time (or extended submission time) are selected for inclusion in the work at 660. The selection for inclusion may be carried out in a number of ways. In an automated method, where multiple elements can be included in the work, those one or more submitted elements having votes, rankings, or ratings in excess of a defined threshold (which may be defined in the attributes for the collaborative work, and may be either system-defined or user-defined by the initiating user) are automatically selected for inclusion in the first set of elements. Alternatively, those one or more submitted elements having a number of votes, or rankings or ratings to exclude the element in excess of a defined threshold are excluded from the first set, and all remaining submitted elements are thus selected for inclusion. Alternatively, the selection may be carried out by the initiating user or a subset of participating users, based on the feedback received from the reviewer users. Where only a single element of a given type can be selected for inclusion, then the element with the highest number of votes may be selected. However the submitted elements are selected, they are stored in association with the first set of elements of the collaborative work. This may comprise storing data for these selected elements in one or more database records related to the collaborative work, or setting a flag or other attribute value in the submitted element or the collaborative work at 665 as stored by the application module 340. The number of elements stored in association with the set of elements may be limited by various attributes of the collaborative work; for example, if the template does not specify a maximum number of elements of a given type in an element set, an unlimited (or at least a larger) number of character elements may be permitted, whereas only a single title element may be selected for the set. Thus, the selection methodology may depend on the number of elements to be selected; while the application module 340 may select a plurality of characters for inclusion in the element set by selecting all those characters having votes exceeding a threshold, only the title having the largest number of votes is selected.

Tables 4 and 5 illustrate an example user submission and example selected content for a collaborative work 400 such as the screenplay writing project illustrated in FIG. 6, during and after the completion of a single submission period as illustrated in FIG. 7. In this example, a "screenplay" collaborative work type has a first element set 410, which includes a set of attributes for the work 400 (e.g., title, description, setting, etc.) and character elements for which user submissions are received during the first submission period. During the course of the submission period, contributor users may submit proposed element data for the title, description, setting, character, etc. elements. The submitted data generally comprises a user-submitted attribute for the element; thus, a user-submitted title or description element would comprise user-submitted text data. To submit a character element, the user may submit text and/or image or other data, such as a name, gender, age, sketch, etc. In addition, during the course of the first submission period, reviewer and/or contributor users may submit feedback for the user-submitted elements. Table 4 sets out example elements resulting from three user-submissions (both elements and feedback) that may be received during the first submission period for an example title element type:

TABLE 4

Example title element user submissions.

User-Submitted Element <00000001>

| | |
|---|---|
| Element Type | <element_type="title"> |
| Containing Collaborative Work | <project_id="0001"> |
| Title Content | <title="The Mummy Mystery"> |
| Date | <system-defined creation date> |
| Owner | <system-defined user identifier> |
| Votes | <system counted feedback> |

User-Submitted Element <00000002>

| | |
|---|---|
| Element Type | <element_type="title"> |
| Containing Collaborative Work | <project_id="0001"> |
| Title Content | <title="The Mystery Machine Rides Again"> |
| Date | <system-defined creation date> |
| Owner | <system-defined user identifier> |
| Votes | <system counted feedback> |

User-Submitted Element <00000003>

| | |
|---|---|
| Element Type | <element_type="title"> |
| Containing Collaborative Work | <project_id="0001"> |
| Title Content | <title="A Dog and His Gang"> |
| Date | <system-defined creation date> |
| Owner | <system-defined user identifier> |
| Votes | <system counted feedback> |

In these examples, a title element includes a reference to the containing collaborative work; the title content entered by the user; other data identifying the submission such as the date of submission, owner identifier (i.e., identity of user who submitted the element); and a system-tracked number of votes. In this case, the template 301 may specify that the collaborative work 400 can only have one selected title. In this example, upon expiry of the submission period, the system 200 may then automatically select the user-submitted title element that received the highest number of votes to include. Similar user submissions may be received for other elements of the first set of elements 410, such as setting, time period, and characters, although depending on the nature of the work, the system 200 may permit a plurality of characters to be selected for inclusion. After the first submission period, the content for the collaborative work will include the selected user-submitted elements for the first set of elements 410, as generally illustrated in Table 5 below:

TABLE 5

Example collaborative work content after selection of submissions for a first element set.

Collaborative Work ID <project_id="0001">
Collaborative Work Type <project_type=" screenplay">

| Attribute | Value |
|---|---|
| <title> | <title="The Mummy Mystery"> |
| <description> | <desc="A diverse group of high school students and a talking dog band together to solve..."> |
| <setting> | <setting="1970s"> |
| <created date> | <system-defined> |
| <owner> | <system-defined> |
| ... | ... |
| Character Element Set | Attributes-Values |
| <character_1> | <name="Daphne"; gender="female"; image="image0001.jpg"...> |
| <character_2> | <name="Fred"; gender="male"; image="image0002.jpg"...> |
| ... | ... |

Returning to FIG. 8, at block 670 the application module 340 determines whether there are subsequent stages or periods associated with further element sets (e.g., element set 420 in FIG. 6). If there is a subsequent stage, at 685 the next set of elements for which user submissions must be collected is retrieved from the template 310; the user interface is updated at 690 to reflect the new submissions to be made, and where the submission period is timed, the timer is set against at 695 to count down the default time period (or user-defined time period) for receiving submissions for the subsequent stage. The process thus returns to 640 and receipt of submissions, edits, and feedback 628-635 as described above. Table 6 illustrates the state of the collaborative work 400 of FIG. 6 after second and third submission periods have been completed and user-submitted elements for the second set of elements 420 (corresponding to the second submission period) and third set of elements 430 (corresponding to the third submission period) have been selected:

TABLE 6

Example collaborative work content after selection of submissions for second and third element sets.

Collaborative Work ID <project_id="0001">
Collaborative Work Type <project_type=" screenplay">

| Attribute | Value |
|---|---|
| <title> | <title="The Mummy Mystery"> |
| <description> | <desc="A diverse group of high school students and a talking dog band together to solve..."> |
| <setting> | <setting="1970s"> |
| <created date> | <system-defined> |
| <owner> | <system-defined> |
| ... | ... |
| Character Element Set | Attributes-Values |
| <character_1> | <name="Daphne"; gender="female"; image="image0001.jpg"... > |
| <character_2> | <name="Fred"; gender="male"; image="image0002.jpg"...> |
| ... | ... |
| Storyline Element Set | Attributes-Values |
| <storyline> | <desc="Students from different backgrounds and family issues meet as a result of being assigned detention..."> |
| Scene Summary Element Set | Attributes-Values |
| <scene_summary_1> | <location="INT. - Daphne's home"; time_of_day="evening"; characters="character_1, character_4...", desc="Daphne and her parents have a dispute..." order="1"> |
| <scene_summary_2> | <location="EXT. School"; time_of_day="morning"; characters="character_1, character_2, character_3", desc="The gang meet up...", order="2"...> |
| ... | ... |

In this example, the element set 420 consists of a single storyline element; thus, multiple user submissions received during the corresponding second submission period may be selected in a similar manner to the title element in the first set of elements 410. The following element set 430 comprises a number of scene summaries for a plurality of scenes. The number of scenes required for the collaborative work 400 may be set in the template 301.

The scene summary elements illustrated in Table 6 illustrate an example of a hierarchical relationship between elements of different types. The relationship is provided by a dependence of subsequent elements on previous elements. Scene summary elements, in this example, include one or more references back to character elements (represented as characters="character_1, character_4 . . . "), which were previously selected in the first submission period, because an attribute of a scene summary element is the presence of one or more characters defined by character elements of element set 410. Therefore, when contributor users provide their submissions for a scene summary element, the attributes input by the contributor users can include a selection of one or more of the previously-defined character elements. The selection may be made by means of the user interface mentioned above. The example scene summary elements also include ordinal attributes (e.g., order="1") indicating their relative order within their respective element set. In some implementations, where elements in a given set must appear in a defined order in the collaborative work and output files, the user interface may restrict submission of elements by users to the defined order; for example, contributor users may be limited by the user interface to submit at least one proposed element for the first element in the defined order before proposed elements for the next element in the defined order can be submitted, and so on. For example, where a set of scene summaries (scene summary 1, scene summary 2, scene summary 3 . . . ) must be submitted in order, a contributor user may only submit scene summary 2 after at least one submission for scene summary 1 has been received. Alternatively, contributor users may be permitted by the user interface to specify the order of their submitted element within the element set.

In some implementations, users may be permitted to revise a previously defined element set (such as element set 410) in a subsequent submission period. This may occur, for example, where a contributing user determines during the third submission period (corresponding to scene summary element set 430, above) that a further character would be beneficial. The user submission may therefore include attributes for a scene summary element, as well as attributes for a new character element, which is referenced in the scene summary attributes as in the example content of Table 6. If the submitted scene summary element is selected for inclusion in the collective work 400, then the new character element is added to the collective work as well. In subsequent submission periods, users may also be permitted to propose altering the order of elements in a previous element set, if the order of the elements was defined. Alteration can occur by insertion of new elements, combining or splitting existing elements, reallocating content between elements by proposing that an attribute of a submitted element be moved to another element, or reordering the elements. For example, in a subsequent submission period after the third submission period mentioned above, a contributing user may propose inserting an additional scene summary element between two of the scene summary elements previously deemed included in that element set; combining two scene summary elements in the previous element set; splitting a scene summary element of the previous element set into two or more scene summary elements; reallocating content in a first scene summary element to another scene summary element in the previous set; or rearranging the order of scene summary elements within the previous set. These proposals would be subject to feedback by the reviewer users, as described above, to determine which alterations are applied to the elements.

The process thus progresses through each set of elements defined for the collaborative work until it is determined at 670 that there are no further stages to be carried out. At this point, the collaborative work will comprise a plurality of sets of elements, each of which comprises one or more user-submitted elements that were selected based on user feedback received during the corresponding submission period for that set of elements. The collaborative work elements having been collected by the system 200, a final document or file may be generated from the collaborative work at 680, as discussed below.

Figure 9:
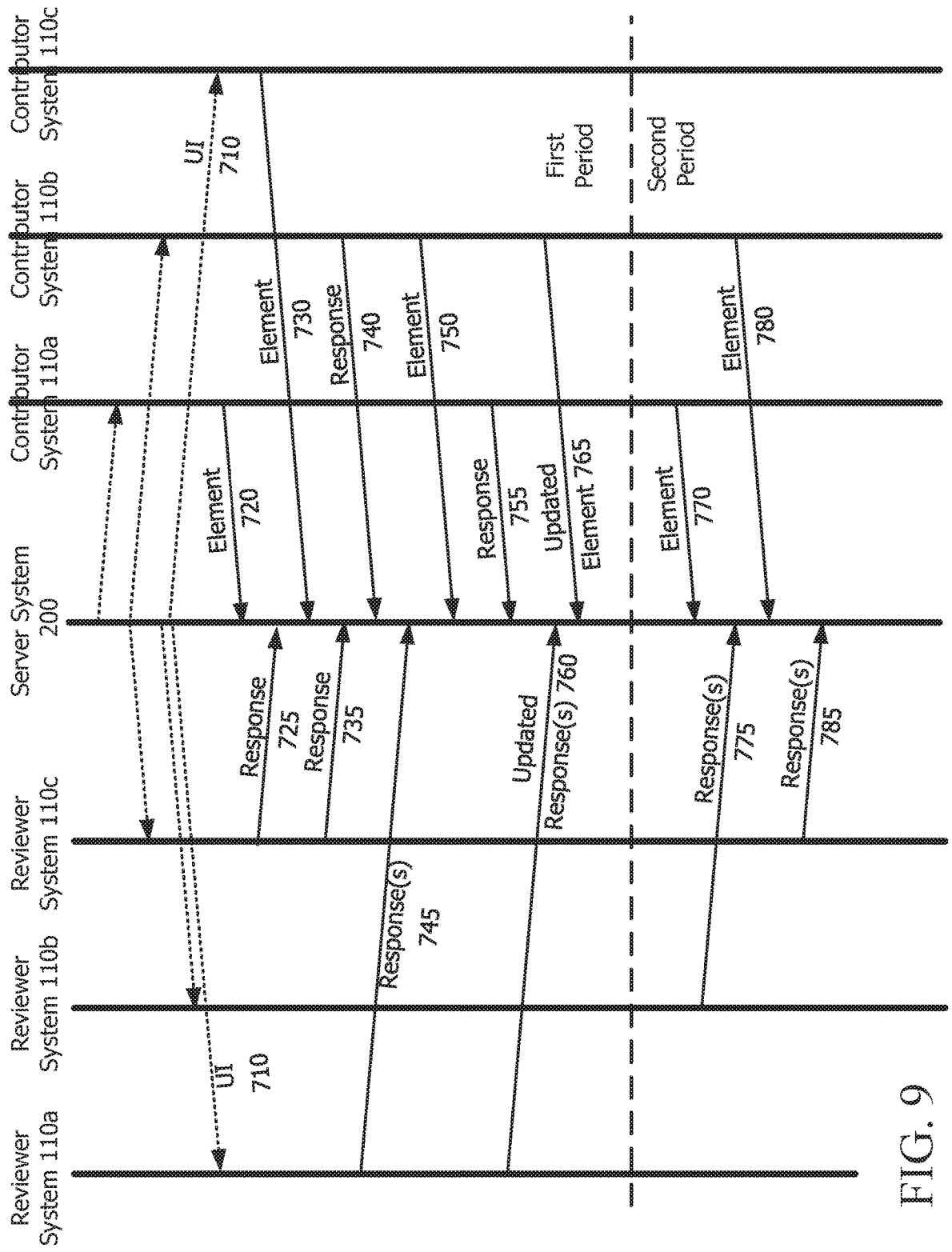
FIG. 9 is an interaction diagram illustrating data flow between various client systems and the server system during a plurality of units of collaborative work.

FIG. 9 illustrates the interaction of reviewer and contributor users and their client systems 110 with the system 200 during a plurality of submission periods, and in particular illustrates the concurrency or near-concurrency of user feedback and contribution that is possible in the system 200. In the example of FIG. 9, a plurality of reviewer client systems 110a-c and contributor client systems 110a-c are illustrated along with system 200. Phantom lines UI 710 indicate that at any given time during the submission period, user interface data (e.g., webpages) can be transmitted from the server system 200 to any one or more of the participant client systems 110 in response to requests from the browser applications executing on these systems 110. Of course, it will be understood that if a different or dedicated program executes at the systems 110, the user interface data 710 may be sent in response to requests transmitted from those programs.

FIG. 9 illustrates that individual contributor users transmit, from their respective contributor systems 110a-110c, submitted elements 720, 730, and 750 during a first submission period. At the same time, reviewer and/or contributor users at their respective reviewer/contributor systems 110a-110c can view the submitted elements, and transmit submissions in the form of feedback or responses 725, 735, 740, 745, 755 to one or more of the submitted elements. It may be noted that the transmissions from client systems 110 and reception of submissions at the server system 200 can be interleaved; for example, contributed element 730 is received by the server system 200 after a first response 725 is received from reviewer system 110c, but before a second response 735 is received from the same reviewer system 110c. Individual reviewers may submit feedback in respect of one or more of the contributed elements. Contributor users may also edit their submitted elements and provide updates 765; reviewer users may update their responses at any time during the submission period, and thus may update their responses 760 as a result of additional element submissions or changes to element submissions. As illustrated by FIG. 9, element submissions, feedback submissions, and edits to element submissions can be transmitted to, and received by, the system 200 from different users during the same submission period, and can be concurrent or partially concurrent with each other.

FIG. 9 also illustrates some submissions for a subsequent element set that may occur during a subsequent, second submission period. In this subsequent period, elements 770 and 780 are received from contributor systems 110a and 110b, and responses 775 and 785 are received from reviewer systems 110b and 110c. The submitted elements and responses occur during the same submission period, and may occur at least concurrently. The concurrency, or partial concurrency, of the submissions provides for efficient receipt of user feedback and submissions. Contributor users may also edit their own submissions based on feedback received from reviewer users during the same time period; the opportunity to submit, edit, and provide feedback for elements terminates together at the end of the submission period.

As mentioned above, the resultant collaborative work will comprise sets of one or more elements. Not every element must be included in an output document or file generated by the system. Generation of an output document at block 680 in FIG. 8 may thus comprise a selection of a subset of all the elements of the collaborative work, formatted according to format attribute information defined in the template 310 or by the user for that collaborative work.

Figure 10:
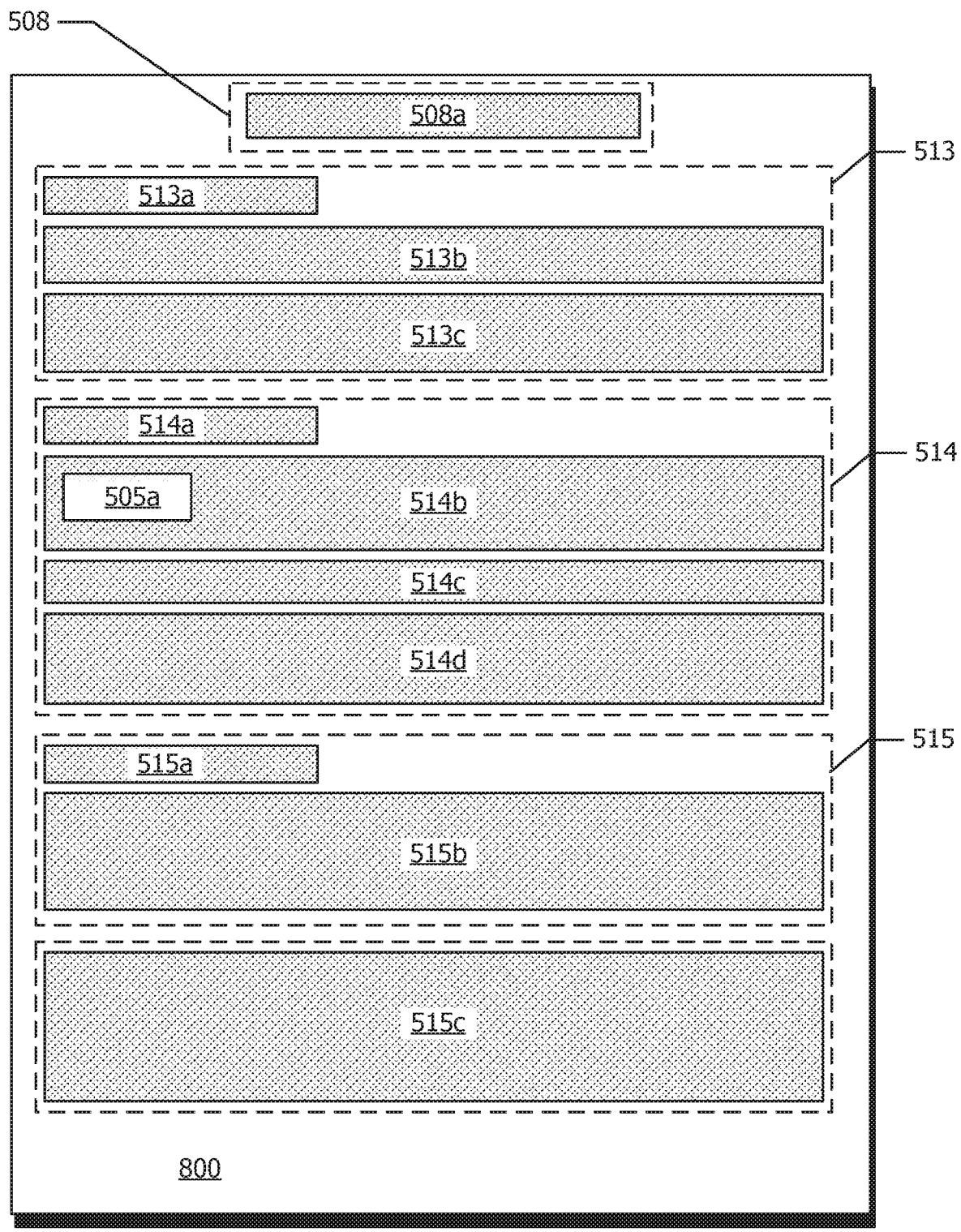
FIG. 10 is a schematic illustrating a generated electronic document.

FIG. 10 illustrates, schematically, an example of an output document 800 generated from the collaborative work 400 of FIG. 6. The output document in this example may be generated in an open or proprietary document format, such as a word processing or text file format (e.g., Microsoft Word™ format; OpenDocument™ text format; Portable Document Format; Rich Text Format; plain text); a webpage or text file in markup format (e.g. HTML or other markup format); image or video format (e.g., JPG, MP3, M4V, etc.); computer-aided design software-compatible files, and the like. In some cases, an output document or file content may comprise embedded or associated image files or video files, depending on the content of elements included in the output document or file. Here, the example output document 800 is a screenplay, and takes as a title the user-submitted content stored in an attribute 508a in element 508; scene location (or slugline) and script scene content 513a, 513b, 513c from script scene element 513; scene location (or slugline) and script scene content 514a, 514b, 514c, 514d from script scene element 514; and scene location (or slugline) and script scene content 515a, 515b, 515c of script scene element 515. In this example, the content selected for script scene element 514 incorporates an attribute value 505a from a character element as well, as a result of an internal reference by the script scene element 514 to the corresponding character element or the output format dictated by the template. The output document or file thus does not incorporate the content from other elements that were comprised in the collaborative work, such as elements 509-512, although these elements were used to assist in defining the elements 513-515. Thus, while the collaborative work may comprise a large number of selected user-submitted elements, the output file may comprise only a subset of these elements, unlike some prior art collaborative authoring systems. The present system thus provides for collaborative authoring of a complex work while enabling user participation in the process of selecting elements for inclusion in the work.

As noted above, individual elements include attributes identifying ownership or attribution information for the contributed elements. Thus, each individual element of a collaborative work can be tracked to an identifiable contributor user, and can be associated with the output documents produced by the collaborative work, for example by including references to the contributor users in the output file (e.g., author credit). The association of contributing users to the collaborative work can be used to allocate legal ownership interest or shares in the collaborative work and its products, such as the output files.

The examples and embodiments are presented only by way of example and are not meant to limit the scope of the subject matter described herein. Variations of these examples and embodiments will be apparent to those in the art, and are considered to be within the scope of the subject matter described herein. For example, some steps or acts in a process or method may be reordered or omitted, and features and aspects described in respect of one embodiment may be incorporated into other described embodiments.

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by one or more processors to perform the operations described herein. The media on which the code may be provided is generally considered to be non-transitory or physical.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object (as in an object-oriented paradigm), applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic devices or memory devices, capable of being logically joined for execution. Functional units may also be implemented as combinations of software and hardware, such as a processor operating on a set of operational data or instructions.

It should also be understood that steps and the order of the steps in the processes and methods described herein may be altered, modified and/or augmented and still achieve the desired outcome. Throughout the specification, terms such as "may" and "can" are used interchangeably. Use of any particular term should not be construed as limiting the scope or requiring experimentation to implement the claimed subject matter or embodiments described herein. Any suggestion of substitutability of the data processing systems or environments for other implementation means should not be construed as an admission that the invention(s) described herein are abstract, or that the data processing systems or their components are non-essential to the invention(s) described herein. Further, while this disclosure may have articulated specific technical problems that are addressed by the invention(s), the disclosure is not intended to be limiting in this regard; the person of ordinary skill in the art will readily recognize other technical problems addressed by the invention(s).

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent and Trademark Office records, but otherwise reserves all rights whatsoever.

The invention claimed is:

1. A non-transitory computer-readable medium bearing code which, when executed by at least one processor of a computer system, causes the computer system to implement the method comprising;
    defining a plurality of element sets for a collaborative work, each element set comprising one or more elements of the collaborative work;
    for a first element set of the plurality of element sets, during a first submission period, and at least partially concurrently during the first submission period:
        receiving and presenting, over a network, a first plurality of user-submitted elements for the first element set; and
        receiving and, presenting, over the network, at least one user response corresponding to at least one user-submitted element of the first plurality of user-submitted elements;
    on termination of the first submission period, storing one or more user-submitted elements of the first plurality of user-submitted elements in association with the first element set, the one or more user-submitted elements being selected for inclusion in the first element set based on, the at least one user response;
    during a subsequent submission period, and at least partially concurrently during the subsequent submission period:
        receiving and presenting, over the network using the communications subsystem, a subsequent plurality of user-submitted elements for a subsequent element set of the plurality of element sets;
        receiving and presenting, over the network using the communications subsystem, at least one user response corresponding to at least one user-submitted element of the subsequent plurality of user-submitted elements;
    on termination of the subsequent submission period, storing in the memory one or more of the user-submitted elements of the subsequent plurality of user-submitted elements in association with the subsequent element set, the one or more user-submitted elements of the subsequent plurality of user-submitted elements being selected for inclusion in the subsequent element set based on the at least one user response; and
    receiving an additional user-submitted element of a type associated with an element set of a previous submission period, and storing the at least one additional user-submitted element in association with the element set of the previous submission period on determining that the at least one additional user submitted element is to be added to the element, set of the previous submission period, the determining comprising:
        during the subsequent submission period, presenting the at least one additional user-submitted element to the plurality of users over the network, and receiving over the network and storing at least one user response corresponding to the at least one additional user-submitted element, the at least one user response determining that the at least one additional user-submitted element is to be added to the element set of the previous submission period.

2. The non-transitory computer-readable medium of claim 1, wherein more than one of the plurality of user-submitted elements are selected for inclusion in the first element set.

3. The non-transitory computer-readable medium of claim 1, wherein the at least one user response comprises an indication to exclude the corresponding at least one user-submitted element from the first element set, and at least one user-submitted element having a highest number of indications to exclude is excluded from the first element set.

4. The non-transitory computer-readable medium of claim 1, wherein the at least one user response comprises an indication to include the corresponding at least one user-submitted element from the first element set, and at least one user-submitted element having a highest number of indications to include is selected for inclusion in the first element set.

5. The non-transitory computer-readable medium of claim 1, wherein each element set comprises one or more elements associated with a distinct element type distinct from an element type associated with elements in a different element set.

6. The non-transitory computer-readable medium of claim 1, wherein the method further comprises presenting, during the subsequent submission period, a user interface over the network for receiving the subsequent plurality of user-submitted elements, the user interface comprising options to associate a user-submitted element received during the subsequent submission period to at least one of the one or more user-submitted elements associated with a previous element set.

7. The non-transitory computer-readable medium of claim 1, wherein the selection of the one or more user-submitted elements for the first element set determines acceptable content of user-submitted elements received during the subsequent submission period.

8. The non-transitory computer-readable medium of claim 1, wherein each element comprises a set of one or more attributes including at least one metadata attribute and at least one user-generated content attribute, the at least one metadata attribute including an attribution reference.

9. The non-transitory computer-readable medium of claim 1, wherein each user-submitted element is associated by an attribution reference to a user account.

10. The non-transitory computer-readable medium of claim 1, wherein the method further comprises generating and storing an electronic file comprising at least some of the user-submitted elements of the plurality of element sets.

11. The non-transitory computer-readable medium of claim 10, wherein generating and storing the electronic file comprises selecting user-submitted elements of the plurality of element sets for inclusion in the electronic file based on a template defined for the collaborative work.

12. The non-transitory computer-readable medium of claim 1, wherein the at least one additional user-submitted element is comprised in a user-submitted element in the subsequent submission period, and the at least one user response corresponding to the at least one additional user-submitted element is a response to the user-submitted element comprising the additional user-submitted element.

13. A computer-implemented method, comprising:
defining and storing, by at least one processor executing in a data processing system, a plurality of element sets for a collaborative work, each element set comprising one or more elements of the collaborative work;
for a first element set of the plurality of element sets, during a first submission period, and at least partially concurrently during the first submission period:
receiving and presenting, over a network using a communications subsystem, a first plurality of user-submitted elements for the first element set; and
receiving and presenting, over the network using the communications subsystem, at least one user response corresponding to at least one user-submitted element of the first plurality of user-submitted elements;
on termination of the first submission period, storing in memory one or more user-submitted elements of the first plurality of user-submitted elements in association with the first element set, the one or more user-submitted elements being selected for inclusion in the first element set based on the at least one user response:
during a subsequent submission period, and at least partially concurrently during the subsequent submission period:
receiving and presenting, over the network using the communications subsystem, a subsequent plurality of user-submitted elements for a subsequent element set of the plurality of element sets;
receiving and presenting, over the network using the communications subsystem, at least one user response corresponding to at least one user-submitted element of the subsequent plurality of user-submitted elements;
on termination of the subsequent submission period, storing in the memory one or more of the user-submitted elements of the subsequent plurality of user-submitted elements in association with the subsequent element set, the one or more user-submitted elements of the subsequent plurality of user-submitted elements being selected for inclusion in the subsequent element set based on the at least one user response; and
receiving an additional user-submitted element of a type associated with an element set of a previous submission period, and storing the at least one additional user-submitted element in association with the element set of the previous submission period on determining that the at least one additional user-submitted element is to be added to the element set of the previous submission period, the determining comprising:
during the subsequent submission period, presenting the at least one additional user-submitted element to the plurality of users over the network, and receiving over the network and storing at least one user response corresponding to the at least one additional user-submitted element, the at least one user response determining that the at least one additional user-submitted element is to be added to the element set of the previous submission period.

14. The method of claim 13, wherein more than one of the plurality of user-submitted elements are selected for inclusion in the first element set.

15. The method of claim 13, wherein the at least one user response comprises an indication to exclude the corresponding at least one user-submitted element from the first element set, and at least one user-submitted element having a highest number of indications to exclude is excluded from the first element set.

16. The method of claim 13, wherein the at least one user response comprises an indication to include the corresponding at least one user-submitted element from the first element set, and at least one user-submitted element having a highest number of indications to include is selected for inclusion in the first element set.

17. The method of claim 13, wherein each element set comprises one or more elements associated with a distinct element type distinct from an element type associated with elements in a different element set.

18. The method of claim 13, wherein the method further comprises presenting, during the subsequent submission period, a user interface over the network for receiving the subsequent plurality of user-submitted elements, the user interface comprising options to associate a user-submitted element received during the subsequent submission period to at least one of the one or more user-submitted elements associated with a previous element set.

19. The method of claim 13, wherein the selection of the one or more user-submitted elements for the first element set determines acceptable content of user-submitted elements received during the subsequent submission period.

20. The method of claim 13, wherein each element comprises a set of one or more attributes including at least one metadata attribute and at least one user-generated content attribute, the at least one metadata attribute including an attribution reference.

21. The method of claim 13, wherein each user-submitted element is associated by an attribution reference to a user account.

22. The method of claim 13, wherein the method further comprises generating and storing an electronic file comprising at least some of the user-submitted elements of the plurality of element sets.

23. The method of claim 22, wherein generating and storing the electronic file comprises selecting user-submitted elements of the plurality of element sets for inclusion in the electronic file based on a template defined for the collaborative work.

24. The method, of claim 13, wherein the at least one additional user-submitted element is comprised in a user-submitted element in the subsequent submission period, and the at least one user response corresponding to the at least one additional user-submitted element is a response to the user-submitted element comprising the additional user-submitted element.

25. A computer system, comprising:
a memory;
a communications subsystem;
at least one processor in operative communication with the memory and the communications subsystem, the at least one processor being configured to:
define a plurality of clement sets fora collaborative work, each element set comprising one or more elements of the collaborative work;
for a first element set of the plurality of element sets, during a first submission period, and at least partially concurrently during the first submission period:
receive and present, over a network, a first plurality of user-submitted elements for the first element set; and
receive and present, over the network at least one user response corresponding to at least one user-submitted element of the first plurality of user-submitted elements;
on termination of the first submission period, store one or more user-submitted elements of the first plurality of user-submitted elements in association with the first element set, the one or more user-submitted elements being selected for inclusion in the first element set based on the at least one user response;
during a subsequent submission period, and at least partially concurrently during the subsequent submission period:
receive and present, over the network, a subsequent plurality of user-submitted elements for a subsequent clement set of the plurality of element sets;
receive and present, over the network, at least one user response corresponding to at least one user-submitted element of the subsequent plurality of user-submitted elements;
on termination of the subsequent submission period, storing in the memory one or more of the user-submitted elements of the subsequent plurality of user-submitted elements in association with the subsequent element set, the one or more user-submitted elements of the subsequent plurality of user-submitted elements being selected for inclusion in the subsequent element set based on the at least one user response; and
receive an additional user-submitted element of a type associated with an element set of a previous submission period, and storing the at least one additional user-submitted clement in association with the element set of the previous submission period on determining that the at least one additional user-submitted element is to be added to the element set of the previous submission period, the determining comprising:
during the subsequent submission period, presenting the at least one additional user-submitted element to the plurality of users over the network, and receiving over the network and storing at least one user response corresponding to the at least one additional user-submitted element, the at least one user response determining that the at least one additional user-submitted element is to be added to the element set of the previous submission period.

26. The computer system of claim 25, wherein more than one of the plurality of user-submitted elements arc selected for inclusion in the first element set.

27. The computer system of claim 25, wherein the at least one user response comprises an indication to exclude the corresponding at least one user-submitted element from the first element set, and at least one user-submitted, element having a highest number of indications to exclude is excluded from the first element set.

28. The computer system of claim 25, wherein the at least one user response comprises an indication to include the corresponding at least one user-submitted element from the first element set, and at least one user-submitted element having a highest number of indications to include is selected for inclusion in the first element set.

29. The computer system of claim 25, wherein each element set comprises one or more elements associated with a distinct element type distinct from an element type associated with elements in a different clement set.

30. The computer system of claim 29, wherein the at least one processor is further configured to present, during the subsequent submission period, a user interface over the network for receiving the subsequent plurality of user-submitted elements, the user interface comprising options to associate a user-submitted element received during the subsequent submission period to at least one of the one or more user-submitted elements associated with a previous element set.

31. The computer system of claim 25, wherein the selection of the one or more user-submitted elements for the first element set determines acceptable content of user-submitted elements received during the subsequent submission period.

32. The computer system of claim 25, wherein each element comprises a set of one or more attributes including at least one metadata attribute and at least one user-generated content attribute, the at least one metadata attribute including an attribution reference.

33. The computer system of claim 25, wherein each user-submitted element is associated by an attribution reference to a user account.

34. The computer system of claim 25, wherein the at least one processor is further configured to generate and store an electronic file comprising at least some of the user-submitted elements of the plurality of element sets.

35. The computer system of claim 34, wherein generating and storing the electronic file comprises selecting user-submitted elements of the plurality of element sets for inclusion in the electronic file based on a template defined for the collaborative work.

36. The computer system of claim 25, wherein the at least one additional user-submitted element is comprised in a user-submitted element in the subsequent submission period, and the at least one user response corresponding to the at least one additional user-submitted element is a response to the user-submitted element comprising the additional user-submitted element.

\* \* \* \* \*

UNITED STATES PATENT AND TRADEMARK OFFICE
CERTIFICATE OF CORRECTION

PATENT NO. : 10,582,003 B2
APPLICATION NO. : 15/388967
DATED : March 3, 2020
INVENTOR(S) : Khaled Al Sabawi It is certified that error appears in the above-identified patent and that said Letters Patent is hereby corrected as shown below:

In the Claims

Column 21, Line 22, delete "clement" and insert therefor --element--;

Column 23, Line 35, delete "clement" and insert therefor --element--;
Column 23, Line 35, delete "fora" insert therefor --for a--;
Column 23, Line 59, delete "clement" and insert therefor --element--;

Column 24, Line 9, delete "clement" and insert therefor --element--;
Column 24, Line 27, delete "arc" and insert therefor --are--; and
Column 24, Line 44, delete "clement" and insert therefor --element--.

Signed and Sealed this
Nineteenth Day of May, 2020

Andrei Iancu
*Director of the United States Patent and Trademark Office*